July 4, 1967 W. J. KOINZAN 3,329,128
HOG OILER
Filed Oct. 21, 1965 2 Sheets-Sheet 1

Walter J. Koinzan
INVENTOR.

BY Clarence A. O'Brien
and Harvey B. Jacobson
Attorneys

July 4, 1967  W. J. KOINZAN  3,329,128
HOG OILER

Filed Oct. 21, 1965  2 Sheets-Sheet 2

Walter J. Koinzan
INVENTOR.

BY *Clarence A. O'Brien*
and *Harvey B. Jacobson*
Attorneys 3,329,128
HOG OILER
Walter J. Koinzan, Elgin, Nebr. 68636
Filed Oct. 21, 1965, Ser. No. 499,890
5 Claims. (Cl. 119—157)

ABSTRACT OF THE DISCLOSURE

A self feeding device for applying oil to an animal as it rubs thereagainst. The device comprises a hollow cylindrical resrevoir surrounded by an oil transferring sleeve and a plurality of vertical rubbing rods which retain the device in an assembled relationship and function so as to attract the animals thereto.

---

This invention relates generally to a livestock oiler and more particularly to an oiler for hogs.

Briefly, this invention provides means against which hogs will rub in order to scratch themselves at which time the hogs will also rub against oil saturated material thereby enabling the hogs to be oiled. The device utilizes capillary action to maintain the material saturated with oil.

It is an object of the present invention to provide a novel hog oiler device for applying oil or insecticide to hogs.

It is a final object of the present invention to provide a simple or extremely sturdy device containing a large quantity of oil and including means for applying the oil to animals.

It is a further object of the present invention to provide a hog oiler device which not only is adapted to permit hogs to scratch themselves thereon but also provides means for applying oil to the hides of the hogs during the scratching operation.

It is a still further object of the present invention to provide a hog oiler for conveying oil to hog hides, the oiler being extremely stable, having a low center of gravity, thereby eliminating the necessity of attaching the oiler to a ground support.

It is a final object of the present invention to provide a hog oiler which has no moving parts, which is of simple yet efficient construction and which has oil imparting means therein which may be readily and inexpensively replaced when worn.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
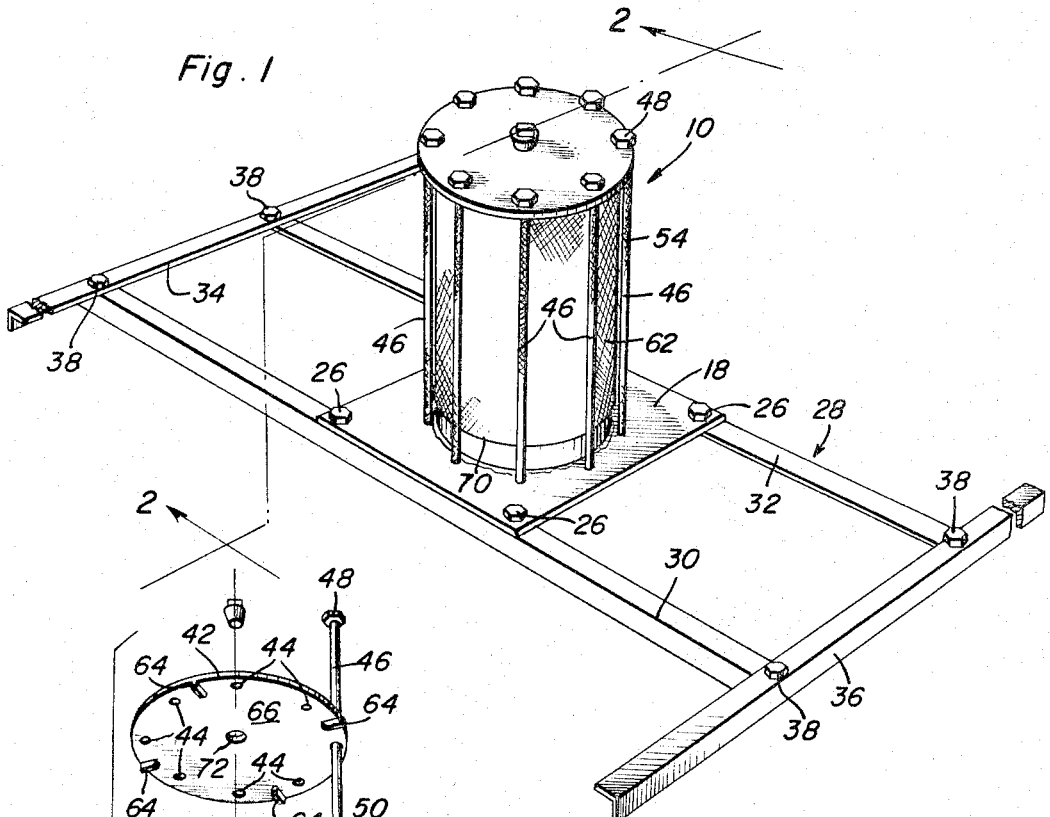
FIGURE 1 is a perspective view illustrating the hog oiler device of the present invention.
Figure 4:
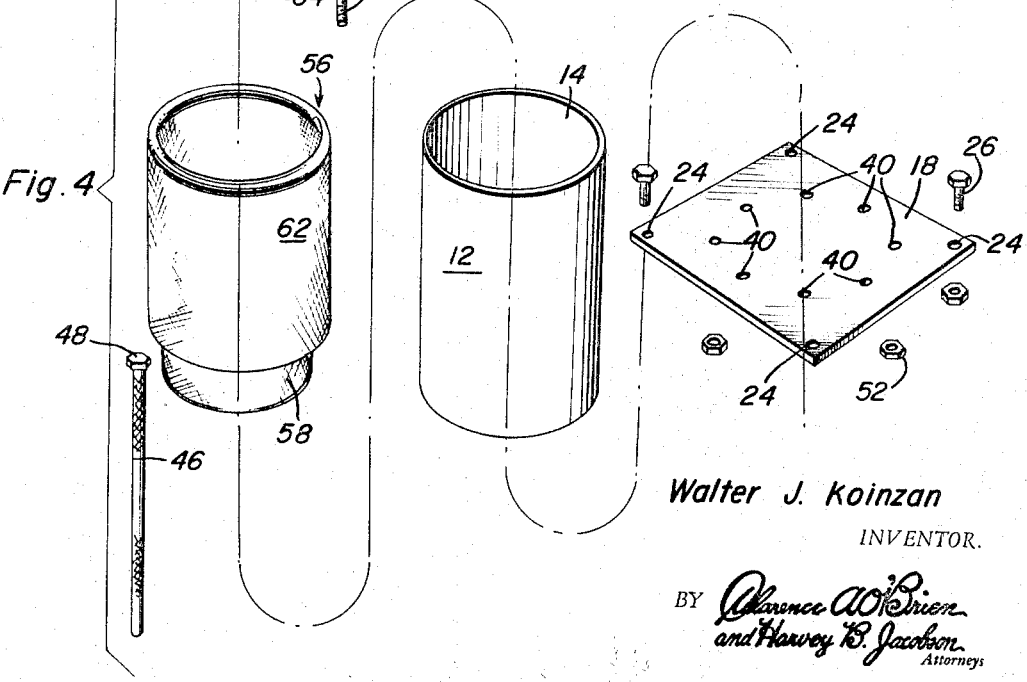
FIGURE 4 is an exploded view illustrating the various component parts of the hog oiler illustrated in FIGURES 1–3.

Referring now more specifically to the drawings, reference numeral 10 is used to generally denote the hog oiler of the present invention. The hog oiler 10 includes a hollow cylindrical member 12 of suitable metallic material having an open top and bottom 14 and 16. The cylindrical member 12 is mounted on a base plate 18, the base plate 18 being substantially square and of a suitable metallic material, the cylindrical member 12 being connected to the base plate 18 by suitable connecting means such as the welds 20. Hence, it will be appreciated that the cylindrical member 12 is provided with a bottom in the form of base plate 18 with a fluid-tight seal therebetween. A quantity of liquid such as the oil or insecticide 22 is contained in the cylindrical member 12, the liquid being retained therein by the base plate 18.

The base plate 18 has four corner mounting holes 24 therein through which suitable attaching means 26 may be positioned to mount the base plate 18 on a base frame generally denoted by reference numeral 28. The base frame 28 comprises a first pair of parallel angle irons 30 and 32 and a second pair of parallel angle irons 34 and 36 mounted on the ends of angle irons 30 and 32 by suitable mounting means 38. Thus, it will be apparent that the hog oiler 10 may be positioned on any substantially flat surface by virtue of the base frame 28. Further, it should be readily apparent that the hog oiler 10 will be extremely stable due to the extension of angle irons 30 and 32 and the cross irons 34 and 36 mounted thereon, as well as the fact that the cylindrical member 12 filled with the liquid 22 will have a substantially low center of gravity inasmuch as the liquid 22 extends all the way to the bottom of the cylindrical member 12. Thus, it will be apparent that the base frame 28 need not be anchored to the surface on which it is placed but will merely rest thereon, thereby lending a great degree of mobility to the hog oiler 10.

The base plate 18 includes a plurality of mounting holes 40, the mounting holes having their center axes lying in a circle on the base plate 18. A substantially circular cover plate 42 is provided to be mounted over the cylindrical member 12, the cover plates 42 having a plurality of mounting holes 44 therein, the mounting holes 44 being spaced about the cover plate 42 and corresponding coaxially with the mounting holes 40 in base plate 18.

A plurality of mounting or rubbing rods 46, each having an enlarged head 48 and a bottom threaded end 50 are mounted through the mounting holes 44 in cover plate 42 and through the mounting holes 40 in base plate 18 in order to retain the cover plate 42 on the cylindrical member 12. Of course, it will be appreciated that the number of mounting holes 40 and 44 will correspond, and pairs of the mounting holes will be aligned in order to receive a mounting rod 46 therethrough, the mounting rods each having a threaded nut 52 on the threaded end 50 thereof to retain the mounting rods in the base plate 18. Further, it will be appreciated that the number and spacing of the mounting holes and mounting rubbing rods may be varied if so desired.

Figure 2:
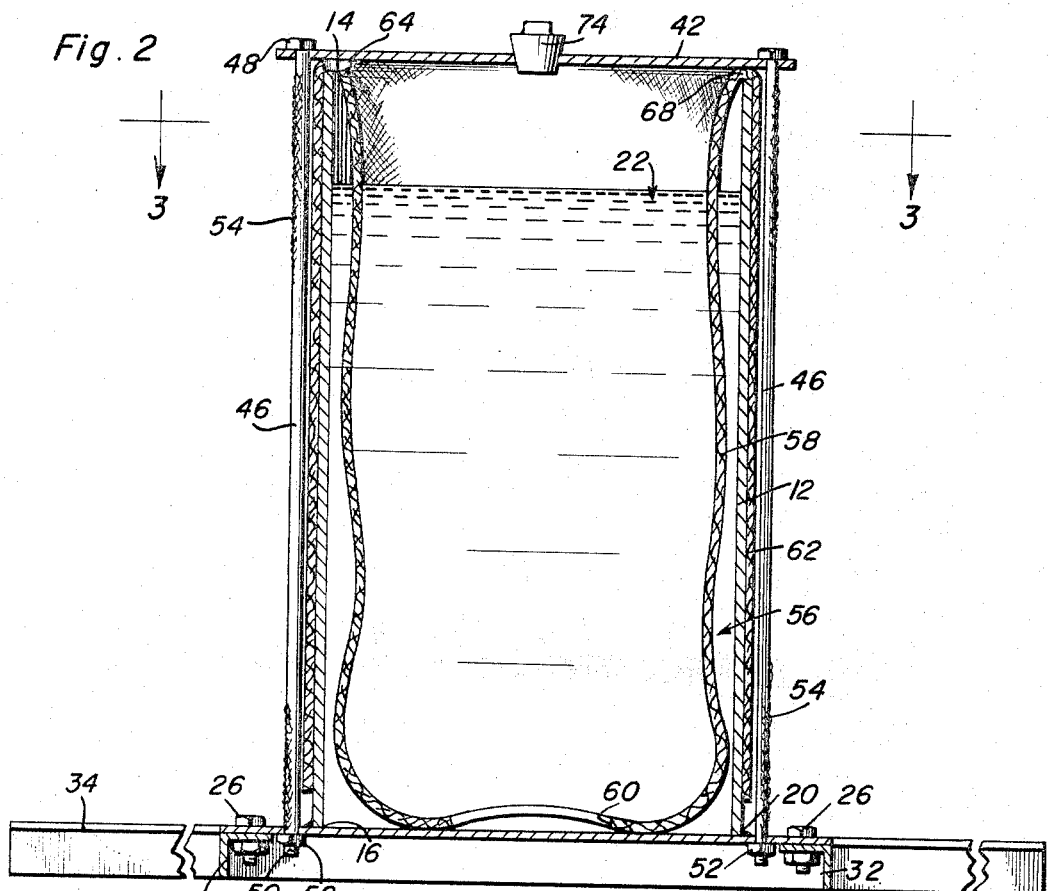
FIGURE 2 is an enlarged vertical sectional view taken substantially on the plane of the line 2—2 of FIGURE 1.
Figure 3:
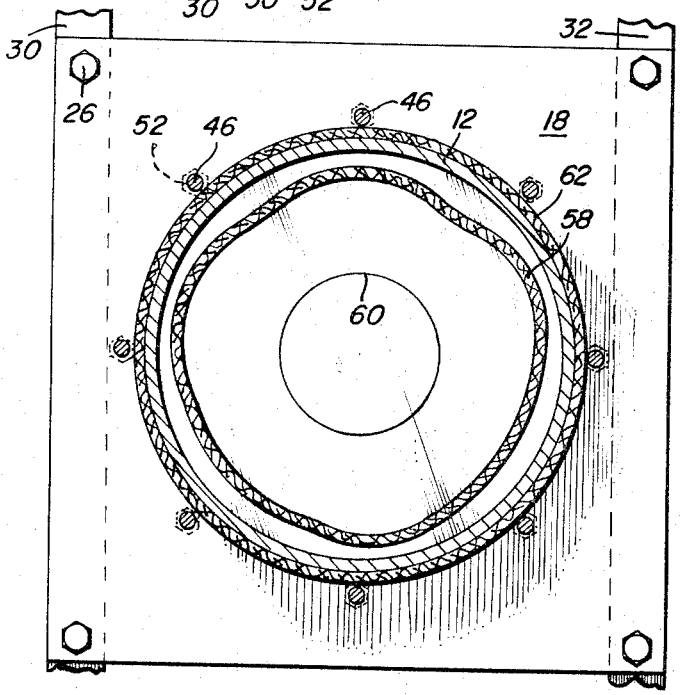
FIGURE 3 is a horizontal sectional view taken substantially on the plane of the line 3—3 of FIGURE 2.

The mounting rods 46 are formed of a suitable metallic material, and each has the outer surface thereof roughened as indicated by reference numeral 54 in order to provide a scratching surface for hogs utilizing the hog oiler 10. Thus, it will be appreciated by viewing FIGS. 1 and 2 that when the hog oiler is assembled, a plurality of scratching posts for hogs are provided by the roughened outer surfaces 54 of the mounting or rubbing rods 46 spaced about the cylindrical member 12. Further, it will be appreciated by viewing FIGURE 1 that adjacent mounting rods 46 provide spaced gaps therebetween, and thus a hog utilizing one or more of the mounting or rubbing rods 46 will necessarily contact the cylindrical member 12 between the adjacent rods. Further, inasmuch as the mounting or rubbing rods 46 are vertical, and inasmuch as the base plate 18 does not extend very far outwardly from the cylindrical member 12, the dirt falling from a hog utilizing the rods will most probably fall on the ground below the base frame 28. Thus, the hog oiler 10 is essentially self-cleaning and will thus require little or no maintenance or care during use thereof.

A sleeve-like member 56 of oil saturable fabric material such as canvas or the like is provided in order to act as a wick for the fluid 22 in the cylindrical member 12. The sleeve-like member 56 includes an inner bag-like portion 58 having the end thereof open as indicated by reference numeral 60, the bag-like portion 58 being draped downwardly to a point adjacent the bottom of cylindrical member 12. The sleeve-like member 56 further includes a sleeve portion 62 which is folded back in tight peripheral engagement with the outer surface of cylindrical member 12 over the top open end 14 of the cylindrical member 12. In order to provide space between the cover plate 42 and the upper end of the sleeve-like member 56 for the sleeve portion 62 of the sleeve-like member 56 to extend through, the cover plate 42 has four depending lugs 64 equally spaced on the lower face 66 thereof, the lugs 64 providing a space 68 between the cover plate 42 and upper end of cylindrical member 12 when the mounting or rubbing rods 46 are mounted through the cover plate and base plate. Thus, by viewing FIGS. 1 and 2 in particular, it will be apparent that the sleeve extends downwardly over the outer peripheral surface of cylindrical member 12 to a point denoted by reference numeral 70, the sleeve portion 62 thereby being in position to be contacted by a hog using the rubbing rods 46 for the purpose of scratching itself.

Of course, it will be appreciated that the oil saturable fabric of which the sleeve-like member 56 is constructed will allow the oil or other fluid 22 in cylindrical member 12 to feed through the fabric by capillary action and saturate the sleeve portion 62 of the sleeve-like member 56. Thus, the oil is transferred from the sleeve 62 to the hog when the hog rubs against the portions of the sleeve 62 which are open between adjacent mounting or rubbing rods 46.

The cover plate 42 has an opening 72 substantially in the center thereof, the opening 72 normally being closed by a plug 74, the plug 74 being frictionally fit in the opening 72 and removable therefrom for purposes of refilling the cylindrical member 12 with oil or other desired fluids. Thus, it will be apparent that the cover plate 42 once fastened on the cylindrical member 12 by the mounting or rubbing rods 46 need not be removed except to replace the sleeve-like member 56 when it is worn. However, it will be also appreciated that it will be quite easy to remove the cover plate 42, inasmuch as the nuts 52 merely have to be threaded off the ends 50 of mounting or rubbing rods 46 in order to remove the cover plate.

Accordingly, in view of the above description, it will be appreciated the hog oiler 10 of the present invention comprises an extremely adaptable unit which serves the function of both a rubbing post or station for hogs as well as a hog oiler. Further, due to the low center of gravity and stability of the device, it need not be fixedly attached to the ground on which it rests and therefore may be readily moved, as for example to various parts of a farm yard or the like. It will also be readily apparent that the sleeve-like member 56 may be readily replaced when worn and further that the hog oiler includes no moving parts thereby eliminating the possibility of unnecessary repairs or reconstruction thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a hog oiler, the combination of a base, reservoir means on said base, said reservoir means adapted to receive oil therein, cover means on said reservoir means, means for maintaining said cover means in fixed spaced apart covering relationship to said reservoir means, means extending through the space between said cover means and said reservoir means for conveying said oil by capillary action outwardly of said reservoir means, a plurality of rubbing rods spaced about the outer periphery of said reservoir means, said rubbing rods being fixedly mounted between said base and said cover means for retaining said cover means on said reservoir means, each of said rubbing rods including a roughened outer surface thereon thereby providing a surface against which hogs can rub, said oil conveying means positioned between adjacent rubbing rods in order to contact the hogs as they utilize the rubbing rods.

2. The combination of claim 1 wherein said resrvoir means comprises a generally hollow cylindrical member mounted in upstanding position on said base, said conveying means comprising an elongate fabric sleeve adapted to be disposed with a portion thereof in peripheral engagement with the outer surface of said cylindrical member and a portion thereof extending downwardly into said cylindrical member and into said oil.

3. The combination of claim 1 wherein said means for maintaining said cover means in fixed spaced apart relationship to said reservoir means comprises a plurality of lugs fixedly secured in depending relation to said cover means at peripherally spaced points thereabout, said lugs engaging the upper end of said reservoir means and maintaining said cover means in spaced relation thereabove.

4. The combination of claim 3 including a plurality of vertically aligned mounting holes in said cover means and said base, each of said rubbing rods extending through one of said aligned pairs of holes, and means on the opposite ends of said rubbing rods for maintaining said rubbing rods in a manner so as to effect a clamping of said cover means down on said reservoir means.

5. In an animal oiler, the combination of a base, reservoir means on said base, said reservoir means adapted to receive oil therein, cover means on said reservoir means, means defining a space below said cover means substantially completely about said reservoir means, said reservoir means comprising a generally hollow cylindrical member mounted in upstanding position on said base, conveying means extending through said space for conveying oil by capillary action outwardly of said reservoir means, said conveying means comprising an elongated fabric sleeve adapted to be disposed with a portion thereof in peripheral engagement with the outer surface of the cylindrical member defining said reservoir means, and a portion thereof extending downwardly into said cylindrical means and into oil contained therein, and a plurality of rubbing rods spaced about the outer periphery of said reservoir means, said rubbing rods being fixedy mounted between said base and said cover means, each of said rubbing rods including a roughened outer surface thereon thereby providing a surface against which animals can rub, said oil conveying sleeve being positioned between adjacent rubbing rods in order to contact the animals as they utilize the rubbing rods.

References Cited

UNITED STATES PATENTS

| | | | |
|---|---|---|---|
| 1,289,670 | 12/1918 | Conelly et al. | 119—157 |
| 1,360,007 | 11/1920 | Morrison | 119—157 |
| 1,999,122 | 4/1935 | Clark et al. | 119—157 |
| 2,785,653 | 3/1957 | Caldwell | 119—157 |
| 2,945,474 | 7/1960 | McIntyre | 119—157 |
| 3,016,879 | 1/1962 | Ryan | 119—157 |
| 3,167,055 | 1/1965 | McLaughlin | 119—157 |
| 3,175,537 | 3/1965 | Paul | 119—157 |
| 3,238,923 | 3/1966 | Grieme | 119—157 |
| 3,238,924 | 3/1966 | Fillbach | 119—157 |

ALDRICH F. MEDBERY, *Primary Examiner.*

SAMUEL KOREN, *Examiner.*